Feb. 7, 1939.       H. G. GROS       2,146,117
POWER TRANSMISSION
Filed May 11, 1936       2 Sheets-Sheet 1
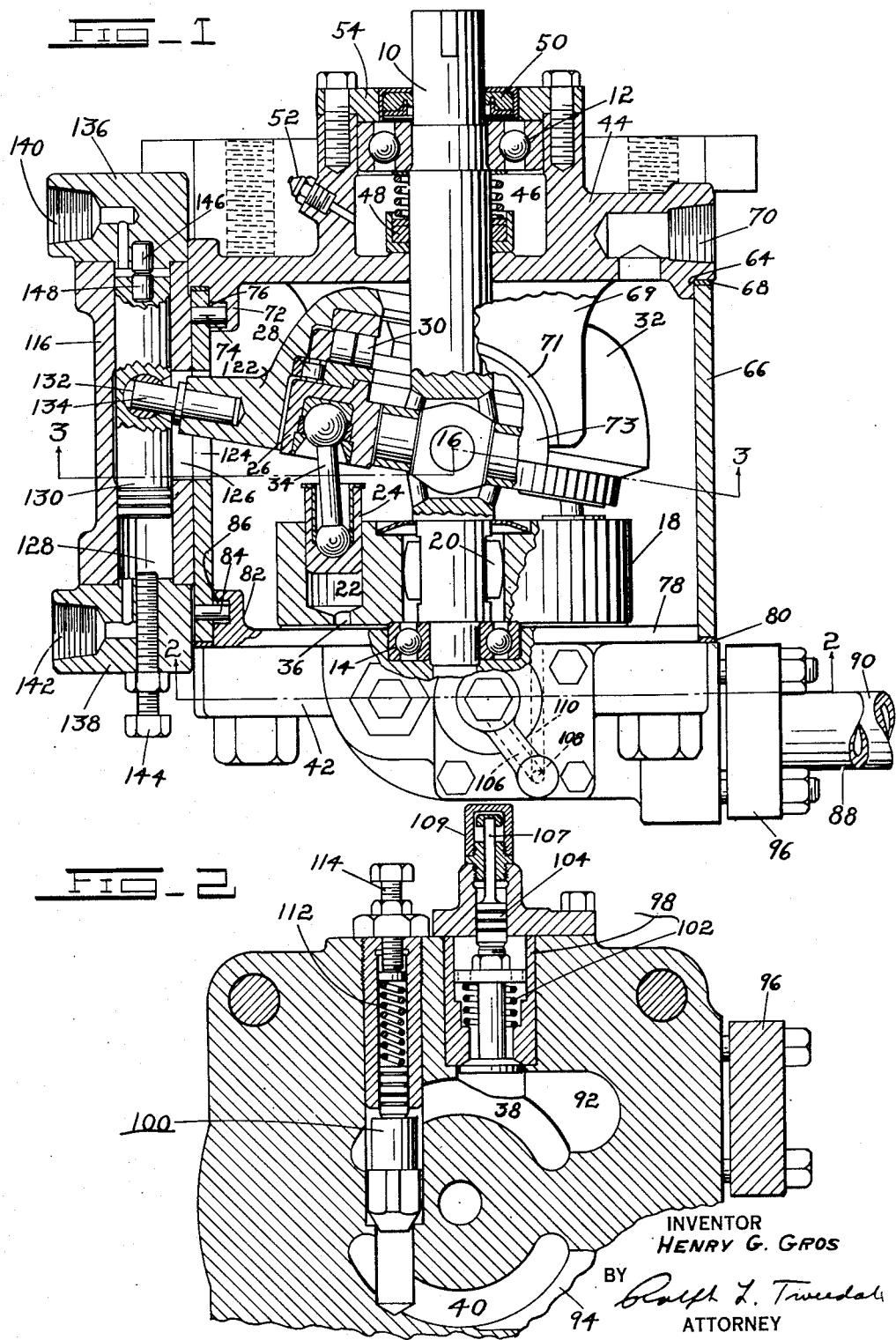
INVENTOR
HENRY G. GROS
BY
Ralph L. Tweedale
ATTORNEY

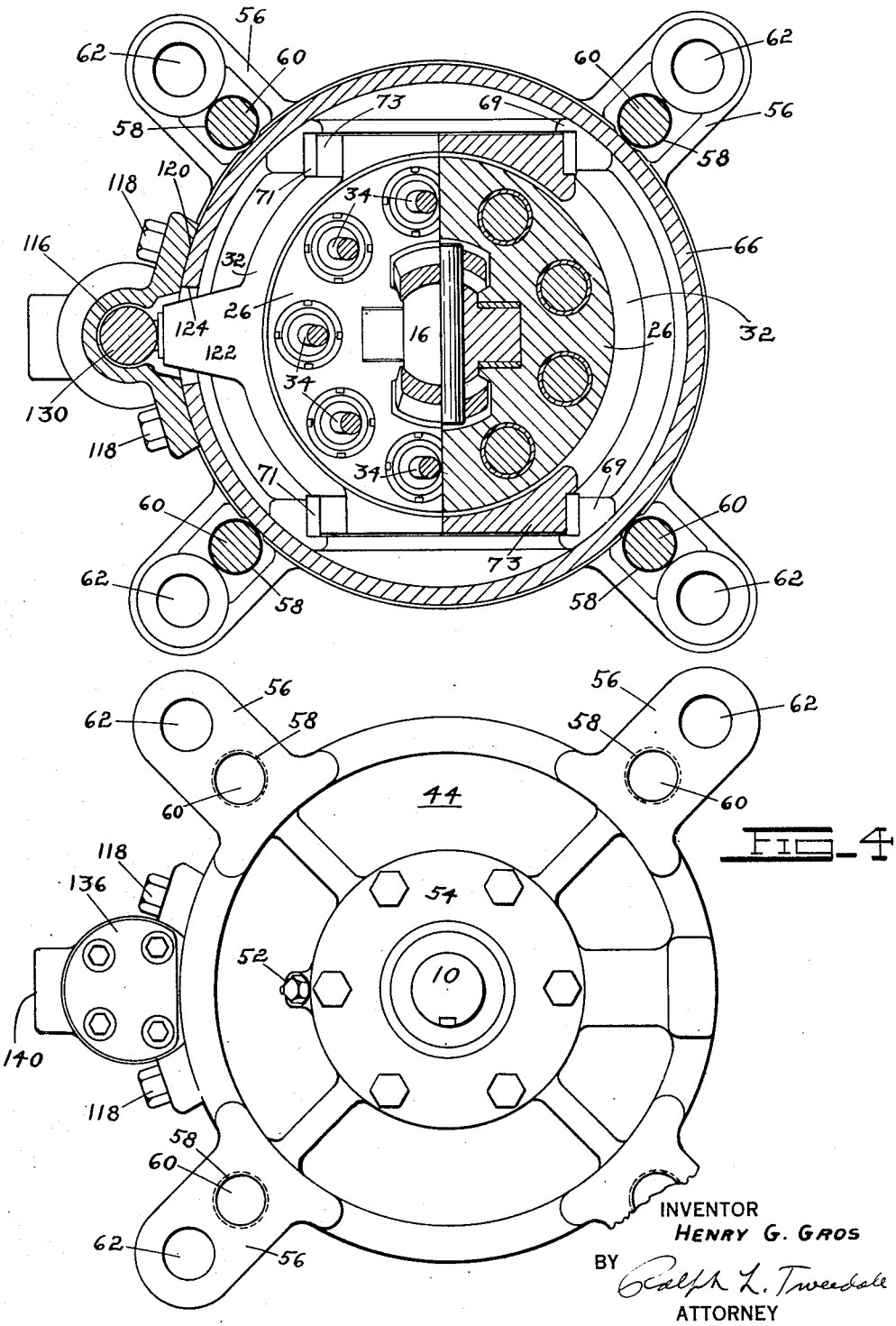

Patented Feb. 7, 1939

2,146,117

UNITED STATES PATENT OFFICE 2,146,117

POWER TRANSMISSION

Henry G. Gros, Oakville, Conn., assignor to The Waterbury Tool Company, Waterbury, Conn., a corporation of Connecticut Application May 11, 1936, Serial No. 79,065

2 Claims. (Cl. 103—162)

This invention relates to power transmissions and more particularly to such devices employing one or more fluid pressure energy translating devices, one of which may act as a pump, and another act as a fluid motor; the displacement of one or more of the devices being adjustable to vary the ratio of power transmission.

The present invention is concerned particularly with the construction of the casing and mounting elements of a fluid pressure energy translating device resulting in an apparatus which is simpler in construction, more economical in first cost, and lighter in weight than devices of this character heretofore constructed. In devices having a plurality of cylinder bores formed in a revolving cylinder barrel with their axes parallel to the axis of rotation of the cylinder barrel wherein reciprocating motion to move the pistons within the cylinder bores is imparted from a plate or socket ring which revolves at a fixed or variable inclination with the axis of rotation of the cylinder barrel, the casing surrounding the essential elements of the device has been heretofore constructed from two or more castings of an intricate nature which have been difficult and costly to machine and have been of excessive weight. The functions of the casing in such devices are to confine a body of idle power transmission fluid, such as lubricating oil, for lubrication and cooling of the working parts; to catch the fluid which leaks from the body of active fluid of the machine; to furnish a source of replenishing fluid; as well as to locate the working parts of the device and maintain them in unvarying alignment relative to each other.

It is an object of the present invention to provide a fluid pressure energy translating device wherein the casing is formed of three members comprising two oppositely facing end plates upon which all the machined surfaces for locating the working parts are situated and an intermediate tubular member formed from tubing or pipe such as is commercially available at low cost.

A further object is to provide a device of this character having a variable displacement wherein a control means for varying the displacement of the device is mounted on the outer cylindrical surface of the intermediate tubular member on the casing.

A further object is to provide such a device wherein the entire mechanism may be mounted on any desired support from one of the end plates of the casing whereby the device may be dismantled to a certain extent without disturbing the means by which the device as a whole is mounted.

Further objects and advantages of the present invention will be apparent from the following description, reference being had to the accompanying drawings wherein a preferred form of the present invention is clearly shown.

In the drawings:

Fig. 1 is a longitudinal cross section of a variable displacement fluid pressure energy translating device embodying the present invention.

Fig. 2 is a fragmentary sectional view on line 2—2 of Fig. 1.

Fig. 3 is a cross section on line 3—3 of Fig. 1.

Fig. 4 is an end view of the device looking downwardly in Fig. 1.

In the form of the invention illustrated in the drawings there is shown a fluid pressure energy translating device of the variable displacement type which may preferably function as a pump for delivering fluid to a motor of any suitable construction, not shown, for the purpose of delivering mechanical power at variable ratios between the speeds of the member driving the pump and the member driven by the motor.

Referring now to Fig. 1 there is shown a drive shaft 10 journalled on bearings 12 and 14 and which drives a universal joint 16 and a cylinder barrel 18, the latter by means of feather keys 20. The cylinder barrel 18 is formed with a plurality of cylinder bores 22 within which are reciprocably mounted a plurality of pistons 24. The universal joint 16 drives a plate or socket ring 26 which is journalled on bearings 28 and 30 in a tilting box 32. Each of the pistons 24 is connected to the socket ring 26 by ball jointed connecting rods 34. The cylinder bores 22 are provided with ports 36 adapted as the cylinder barrel 18 rotates to register alternately with ports 38 and 40 (Fig. 2) formed in a valve plate 42. The principal working parts of the device thus far described are well known as the "Waterbury" type of fluid power unit and will not be described in further detail.

A casing for the mechanism is formed by a back plate 44 carrying the bearing 12, adjacent which is mounted an inner, spring-pressed sealing member 46 rotating with the shaft 10 by the frictional and fluid sealing contact of a resilient packing 48, for the purpose of preventing the passage of power transmission fluid from the interior of the case along the shaft 10. An outer sealing member 50 of resilient material excludes dirt from the bearing 12 and retains a supply of fluid therein which may be supplied from a fitting 52. The sealing member 50 is carried in a plate 54 bolted to the plate 44 serving as a retainer to limit end-wise movement of the bearing 12.

Plate 44 is provided with 4 radially extending lugs 56 (see Figs. 3 and 4) having holes 58 therein for the retention of through bolts 60 and holes 62 therein by which the mechanism as a whole may be mounted to a suitable support. On the opposite face of plate 44 there is formed a circular shouldered recess 64 serving as the seat for a tubular casing member 66, a gasket 68 being interposed between the member 66 and the recess 64 to form a fluid tight seal. The plate 44 also carries a pair of upstanding lugs 69 each having a semi-cylindrical bushing or liner 71 mounted thereon, upon which are journalled the trunnions 73 of the tilting box 32. A pipe connection at 70 is formed in the plate 44 for connection to a conduit leading to an expansion tank for the power transmission fluid within the casing of the device. The plate 44 is also formed with a depending lug 72 within which is fitted a dowel pin 74 for locating the angular position of the tubular member 66 relative to the plate 44. For this purpose the lug 72 is formed with a hole 76 elongated in the up and down direction in Fig. 1 to compensate for the necessary vibrations in thickness of the gasket 68.

The member 66 is formed from a section of tubular stock such as seamless steel tubing or welded wrought iron pipe and is formed with its opposite ends cut square and perpendicular to the axis of the tube. The valve plate 42 is provided with a circular shouldered recess 78, similar to the recess 64, and upon which the tubular member 66 is mounted, with a gasket 80. A lug 82 and dowel pin 84 coact with an elongated hole 86 in the lug to position the valve plate angularly with respect to the member 66. Valve plate 42 is provided with the usual inlet and outlet fluid connections 88 and 90 communicating with the ports 38 and 40 respectively. For this purpose the ports 38 and 40 are formed with extension passages 92 and 94 for conducting fluid at right angles toward the side face of the valve plate where the conduits 88 and 90 are mounted by means of flange connections at 96.

Suitable replenishing and relief valves are indicated at 98 and 100. The replenishing valve 98 is maintained closed by a spring 102 whenever the machine is idle or not loaded. A piston 104 is in communication through conduits 106, 108 and 110 with the port 40 for pushing the valve 98 downwardly when sufficient pressure exists in the port 40 to overcome the force of the spring 102. A stem 107 is provided for manually opening the valve 98 when the machine is being filled with power transmission fluid and is normally covered by a fluid tight cap 109. The relief valve 100 is normally closed under the influence of a spring 112, the force of which may be adjusted by a screw 114. Whenever the pressure within the port 40 exceeds the force of the spring 112, the surface of the valve member exposed to the pressure within the port 40 receives a force sufficient to overcome the force of the spring 112 and permit the valve 100 to open.

For the purpose of positioning the tilting box 32 at any desired inclination to the shaft 10 a control mechanism comprising a housing 116 is mounted on the outer cylindrical surface of the tubular member 66 by means of holes 118, the housing for this purpose being provided with a cylindrical surface 120 (Fig. 3) complementary to the surface of the tubular member 66. The tilting box 32 has a lug 122 projecting from one side thereof through an opening 124 formed in the tubular member 66 and an opening 126 formed in the housing 116. The housing 116 has a cylindrical bore 128 parallel to the axis of the shaft 10 within which is reciprocably mounted a piston 130 having a pivoting and sliding connection at 132 with a stud 134 mounted in the lug 122 of the tilting box 32. The ends of the bore 128 are closed by caps 136 and 138 having fluid connections 140 and 142, respectively, communicating with the opposite ends of the bore 128. An adjustable stop screw 144 limits the downward movement of the piston 130 while hardened plugs 146 and 148 form fixed stops for the piston 130 in its upward movement.

In operation the casing and the working circuit of the machine are filled with power transmission fluid and the shaft 10 is rotated at constant speed by a suitable prime mover, not shown. In the position of the parts illustrated the tilting box 32 is at its maximum inclination to the shaft 10 and the displacement of the machine is therefore at a maximum.

As the shaft 10 rotates the cylinder barrel 18 rotates with it through the keys 20. Likewise, the plate or socket ring 26 is caused to rotate in the plane of the tilting box 32 by the universal joint 16. The pistons 24 are thus reciprocated within the cylinders 22 causing fluid to be drawn into the cylinders as the ports 36 pass over the valve port 38, and to be expelled from the cylinders as the ports 36 pass over the valve port 40. The stroke of the pistons 24 may be varied by changing the position of the tilting box 32. For this purpose the control illustrated may be connected to a suitable control valve and source of pressure fluid for admitting fluid either to the connection 140 or to the connection 142. Thus when pressure fluid is admitted to the connection 140, piston 130 is moved downwardly against the stop screw 144, thus reducing the stroke of the pistons to a value determined by the setting of the screw 144. Likewise, when fluid under pressure is admitted to the connection 142, the piston 130 moves upwardly into the position shown and the piston stroke is again at a maximum.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of a rotating cylinder barrel having a plurality of parallel bores, pistons reciprocably mounted in the bores of the barrel, a ring mounted for rotation in a plane inclined to the axis of rotation of the cylinder barrel, means connecting the pistons to the ring, a tilting box supporting said ring, a valve plate member forming one end of a casing for the device, a back plate member forming the opposite end of the casing and provided with means for supporting said tilting box against the axial thrust of the pistons, said means comprising a pair of arms having open semi-cylindrical bearing surfaces forming the sole supporting contact for said tilting box, said arms projecting beyond said plate for ready machining of said bearing surfaces, a tubular member mounted intermediate said plates to complete the casing, means holding said plates in fluid tight engagement with the tubular member, a housing attached to the outer surface of said tubular member and a member movably mounted in said housing and operatively connected to vary the inclination of said ring.

2. In a fluid pressure energy translating device the combination of a rotating cylinder barrel having a plurality of parallel bores, pistons reciprocably mounted in the bores of the barrel, a ring mounted for rotation in a plane inclined to the axis of rotation of the cylinder barrel, means connecting the pistons to the ring, a tilting box supporting said ring, a valve plate member forming one end of a casing for the device, a back plate member forming the opposite end of the casing and provided with means for supporting said tilting box against the axial thrust of the pistons, said means comprising a pair of arms having open semicylindrical bearing surfaces forming the sole supporting contact for said tilting box, said arms projecting beyond said plate for ready machining of said bearing surfaces, a tubular member mounted intermediate said plates to complete the casing, means holding said plates in fluid tight engagement with the tubular member, and means associated with said casing for controlling the angular position of the tilting box in said bearings.

HENRY G. GROS.